Figure 1:
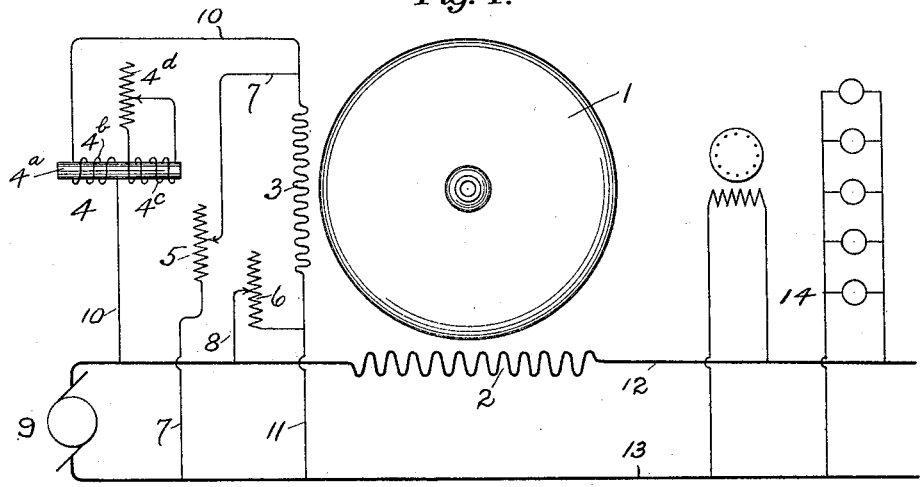

No. 698,645. Patented Apr. 29, 1902.
T. DUNCAN.
ELECTRIC METER.
(Application filed Feb. 6, 1899.)
(No Model.) 2 Sheets—Sheet 1.

Witnesses
Adelaide Kearns
Augusta Viberg

Thomas Duncan Inventor
By his Attorneys Chapin & Denny

No. 698,645. Patented Apr. 29, 1902.
T. DUNCAN.
ELECTRIC METER.
(Application filed Feb. 6, 1899.)

(No Model.) 2 Sheets—Sheet 2.

Witnesses
Adelaide Kearns.
Augusta Viberg.

Thomas Duncan Inventor
By his Attorneys Chapin & Denny

UNITED STATES PATENT OFFICE.

THOMAS DUNCAN, OF FORT WAYNE, INDIANA, ASSIGNOR TO THE SIEMENS & HALSKE ELECTRIC COMPANY OF AMERICA, OF CHICAGO, ILLINOIS, A CORPORATION OF ILLINOIS.

ELECTRIC METER.

SPECIFICATION forming part of Letters Patent No. 698,645, dated April 29, 1902.

Application filed February 6, 1899. Serial No. 704,751. (No model.)

*To all whom it may concern:*

Be it known that I, THOMAS DUNCAN, a citizen of the United States, residing at Fort Wayne, in the county of Allen, in the State of Indiana, have invented certain new and useful Improvements in Electric Meters; and I do hereby declare that the following is a full, clear, and exact description of the invention, which will enable others skilled in the art to which it appertains to make and use the same, reference being had to the accompanying drawings, which form part of this specification.

My invention relates to improvements in induction motor-meters for measuring the energy supplied to inductive and non-inductive translating devices, and has as one of its objects a simplification of the motor-coils by reducing them to the least possible number, thereby not only reducing the cost of manufacture, but also at the same time facilitating the calibration and repair of the apparatus.

Another object of the invention is to so arrange or organize the various circuits that by employing a closed secondary circuit upon the impedance coil or coils and varying the magnitude of its reaction upon the magnetism of the said impedance-coil the current and magnetism of the volt or pressure coil can be adjusted to any suitable lag, such as ninety degrees in the present instance.

Another object is the production of a meter that will not be affected by little changes in the frequency, so that when a meter is calibrated on, say, one hundred and thirty-three periods it will operate accurately on one hundred and twenty-five to one hundred and forty periods or other commercial high-frequency system without requiring any special testing or constants for the different periodicities.

I find that in meters of the induction type having two or more shunt-coils to represent the line-pressure that they are quite sensitive to changes in the periodicity, and in cases where the speed of the motive power is irregular at different intervals of the day the foregoing objection is at once noticeable.

In meters now upon the market for measuring inductive and non-inductive loads there are two or more coils employed in conjunction with or forming the volt or pressure coil to obtain the required lag to ninety degrees of the magnetism, which represents the line or impressed electromotive force. In meters of this class the magnetism representing the line-pressure is obtained by setting up a magnetic field in the respective coils each having a different phase and combining them into a resultant magnetic field having the proper lag, which is ninety degrees in the present instance. In the present invention I employ one pressure or volt field-coil only— *i. e.*, a single winding free from the coöperation of a closed secondary or other shunt-coils—and energize the said pressure or volt coil by a single current, which is the resultant of two other currents impressed upon the pressure-winding in opposite directions, the said current setting up a single magnetic field that is adjusted to ninety degrees behind the impressed electromotive force.

I am aware that meters have been invented in which two or more shunt-circuits carrying currents differing in phase have been employed to excite two or more coils, thereby setting up two or more magnetic fields differing in phase from each other for the production of a resultant magnetic field of a given phase angle; but in the present case I employ two shunt-circuits operating in multiple and supplying current to the terminals of a single-wound volt or pressure field-coil, which causes a single lagging current to traverse the latter, thereby setting up a magnet-field of the same phase relation as the said current and capable of being adjusted to ninety degrees.

Figure 2:
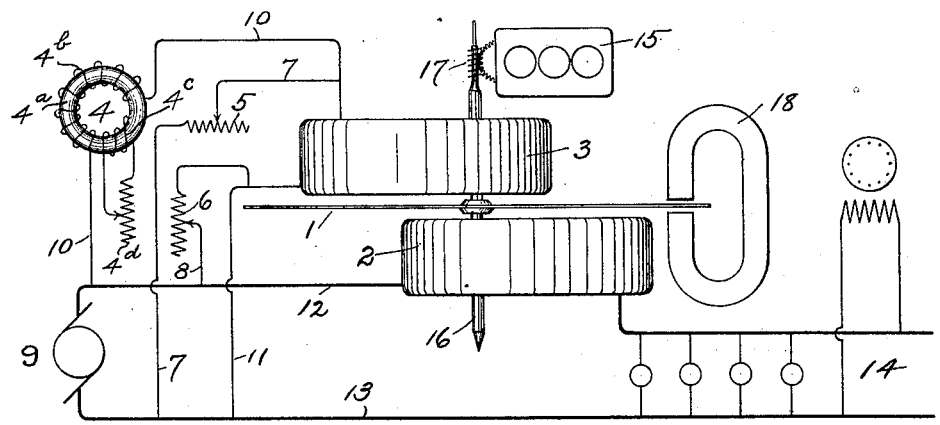
Figure 3:
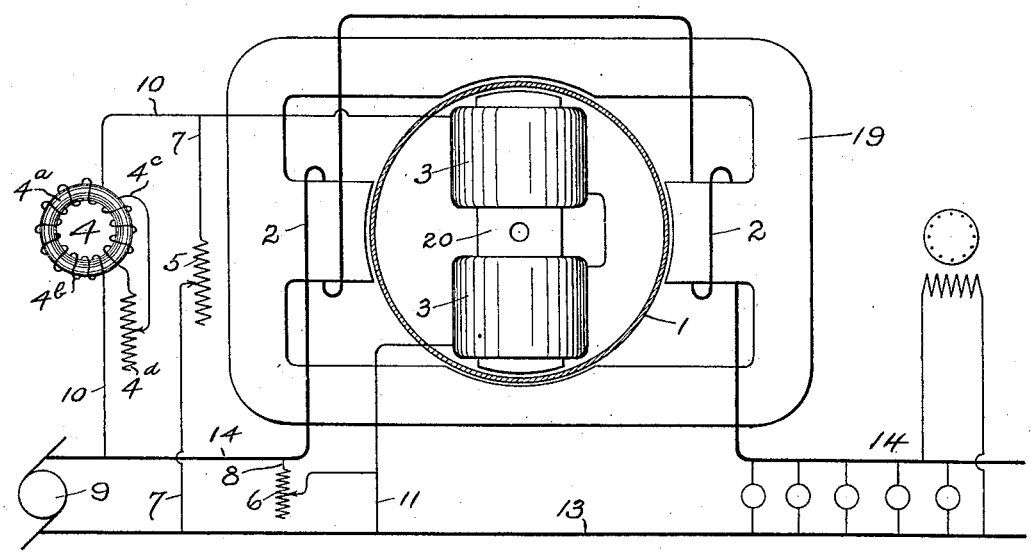
Figure 4:
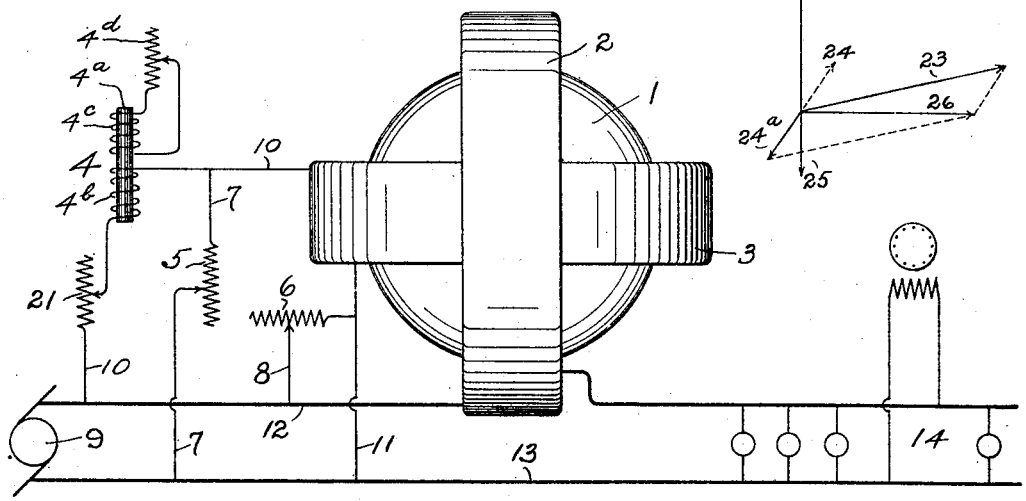
Figure 5:
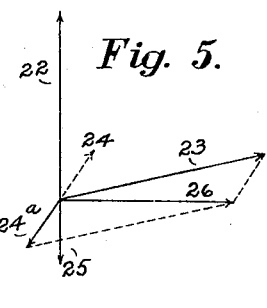

In the accompanying drawings, which form part of this specification, Figure 1 is a diagrammatic view of the circuits and connections used with a meter employing a cylindrical type of armature. Fig. 2 shows the same as applied to a meter having a disk type of armature. Fig. 3 shows the connections with a cylindrical-armature type, also provided with an iron-clad form of magnetic circuit for the series coils. Fig. 4 is another modification in the disposition of the series and shunt field-coils. Fig. 5 shows by vector diagram the current traversing the volt or pressure coil and the other currents of which it is the resultant.

Referring now to Fig. 1, the series field-coil 2 is connected in the main lead 12, through which passes the current supplying the translating devices 14. A pressure or volt coil 3 is suitably located with respect to the said series field-coil by having its magnetic axis parallel but eccentric to the latter. This arrangement of the series and shunt or volt coil was first shown and described in a Patent No. 501,000, granted to me on the 4th day of July, 1893. A metallic armature 1, in the form of a suitably-closed secondary, is revolubly arranged in inductive relation to and between the said series and volt coils, so that by the inductive influence of each the said armature is rotated with a torque proportional to the energy. It is understood in the art that to cause the armature 1 to rotate there must be a difference of phase between the magnetic field of the coil 2 and that of the coil 3, and, further, this difference of phase must be a quarter-period, or ninety degrees, before the meter will be capable of measuring inductive loads with accuracy. The method at present employed to do this is to lag the current or magnetism of the volt or pressure circuit to ninety degrees behind the line-pressure, when the torque exerted upon the armature will vary with and be proportional to the sine of the angle between the magnetism of the series and volt coils. Assuming that the current through the series field-coil 2 is being supplied to a non-inductive load, the said current will be approximately in step or phase with the electromotive force between the mains 12 and 13, and under these conditions the current through the field-coil 3, which represents the said electromotive force, must be caused or made to lag ninety degrees or a quarter-period behind the current in the said series field-coil 2. An impedance-coil 4, which comprises the iron core $4^a$ and a suitable coil or winding $4^b$, is employed in the ordinary manner to lag the current through the shunt-circuit 10 and 11; but for well-known reasons this arrangement cannot give sufficient lag to bring the current in the circuit 10 and 11 to ninety degrees, and to accomplish this I connect to the terminals of the volt field-coil 3 another shunt-circuit 7 and 8, which also includes the variable resistances 5 and 6, one upon each side of the said volt field-coil 3. The current through the circuit 10 and 11 combines in the volt field-coil 3 with the current through the circuit 7 and 8 into a single resultant current, which is accompanied by a single magnetic field of the proper phase relation or lag. The manner in which this is obtained may be readily seen by referring to Fig. 5, in which the line 22 represents the impressed electromotive force and also the magnetism of the series field-coil 2 when the meter is supplying current to non-inductive translating devices.

The reference-numeral 23 represents the magnitude and angle of the current through the circuit 10 and 11, and 24 represents the lag of the current through the circuit 7 and 8, due to the self-induction of the volt field-coil 3. By so connecting the said circuit 7 and 8 that its current will flow in an opposite direction to the current in the circuit 10 and 11, thereby producing the equivalent of an opposing electromotive force 25 or one lagging one hundred and eighty degrees behind the impressed electromotive force 22, the reversed current 24, which is shown by the line $24^a$, is obtained. More specifically, the paths through which the currents are impressed in opposite directions may be described as follows: One path commences at the connection of the conductor 10 with the main 12, includes the primary $4^b$ of an induction-coil, the pressure-winding 3, and the conductor 11, uniting the pressure-winding with the main 13. The other path impressing current upon the winding 3 in an opposite direction commences at the connection of the conductor 8 with the main 12, includes the adjusting resistance 6, the pressure-winding 3, and the conductor 7, connected with the main 13, the latter conductor including the adjusting resistance 5. I have thus provided a meter having two field-windings, means in shunt of one of said windings for adjusting the phase of the magnetism due thereto, a primary $4^b$ in circuit with the latter winding and placed across the work-circuit, a secondary circuit in inductive relation to the primary being employed. These two currents 23 and $24^a$ combine into a current 26, which is the resultant of the said currents 23 and $24^a$. This lagging current 26 furnishes the requisite magnetic field having a lag of ninety degrees or a quarter-period behind the impressed electromotive force. The difference in phase between the coils 2 and 3 sets up a shifting or rotary field that actuates the armature 1 in a well-understood manner.

The adjustment of the current 26 is made by varying one or both of the resistances 5 and 6 or the coil $4^c$ with the resistance $4^d$, which is part of the impedance-coil. I prefer to use the adjustment by means of the resistance $4^d$, since it can be so proportioned that a slight change in resistance can have a large range in effecting the self-induction of the circuit 10 and 11. In employing either or both of these methods it is understood that efficiency must be kept in view, so that such an arrangement as will consume the least energy may be utilized. It is understood that when the resistance $4^d$ is to be employed the resistances 5 and 6 are adjusted to cause the current 26 to lag more than ninety degrees when the resistance $4^d$ is open-circuited, thereby permitting the resistance 4$^d$ to have a proper range of adjustment in controlling the inductance of the coil 4$^b$.

Fig. 2 shows the principal elements requisite to an operative device involving my invention, and which comprises a series or ampere field-coil 3, a disk armature 1, a spindle 16, a worm 17, a registering-train 15, and a retarding-magnet 18.

Fig. 3 shows a very efficient form, which comprises principally an iron-clad type of field 19, having suitable inwardly-projecting pole-pieces upon which the series coils 2 are mounted. This type insures a low reluctance in the magnetic circuit of both coils 2 and 3.

Fig. 4, as already stated, shows a modification in the disposition of the actuating or energizing field-coils, but does not possess meritorious features over the foregoing types.

In the several figures forming part of this specification I have shown the resistances 5 and 6 included in the circuit 7 and 8; but I have also obtained good results by eliminating the resistance 5 and employing the resistance 6 only.

The registering-train 15 may be of any suitable construction.

The function of the damping-magnet 18, employed to regulate the speed of the armature, is well understood by those skilled in the art and need not be described in detail here.

Having thus described my invention, what I desire to secure by Letters Patent is—

1. The combination with two field-windings of a meter, of means in shunt of one of said windings for adjusting the phase of the magnetism due thereto, a primary 4$^b$ in series with the latter winding, and included therewith across the work-circuit, and a secondary circuit in inductive relation to said primary winding, one terminal of the phase-adjusting means being interposed between the said winding and the primary, while the other terminal of said means is connected with the remaining terminal of the said winding, substantially as described.

2. The combination with two field-windings of a meter, of means in shunt of one of said windings for adjusting the phase of the magnetism due thereto, a primary 4$^b$ in circuit with the latter winding and placed across the work-circuit, and a secondary circuit in inductive relation to the said primary winding, one terminal of the phase-adjusting means being interposed between the said winding and the primary, while the other terminal of said means is connected with the remaining terminal of the said winding, substantially as described.

3. The combination with two field-windings of a meter, of means in shunt of one of said windings for adjusting the phase of the magnetism due thereto, a primary 4$^b$ in circuit with the latter winding and placed across the work-circuit, and a closed secondary circuit in inductive relation to said primary winding, one terminal of the phase-adjusting means being interposed between the said winding and the primary, while the other terminal of said means is connected with the remaining terminal of the said winding, substantially as described.

Signed by me at Fort Wayne, Allen county, State of Indiana, this 28th day of January, A. D. 1899.

THOMAS DUNCAN.

Witnesses:
ADELAIDE KEARNS,
GEORGE E. JOHNSON.